US010612527B2

(12) United States Patent
Chacon et al.

(10) Patent No.: US 10,612,527 B2
(45) Date of Patent: Apr. 7, 2020

(54) METHODS FOR REFURBISHING WIND TURBINES

(71) Applicant: General Electric Company, Schenectady, NY (US)

(72) Inventors: Joseph Lawrence Chacon, Greenville, SC (US); Scott Shapiro, Cohoes, NY (US); Noah Pennington, Simpsonville, SC (US); Jay Leonard, Greenville, SC (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 15/621,011

(22) Filed: Jun. 13, 2017

(65) Prior Publication Data

US 2018/0355852 A1 Dec. 13, 2018

(51) Int. Cl.
*H01R 43/00* (2006.01)
*H05K 13/00* (2006.01)
*F03D 80/50* (2016.01)
*F03D 80/80* (2016.01)
*F03D 13/20* (2016.01)

(52) U.S. Cl.
CPC .......... *F03D 80/50* (2016.05); *F03D 13/20* (2016.05); *F03D 80/82* (2016.05); *F03D 80/85* (2016.05); *Y10T 29/49718* (2015.01)

(58) Field of Classification Search
CPC .......... F03D 80/50; F03D 13/20; F03D 80/82; F03D 80/85; H01R 13/432; H01R 13/625; Y10T 29/49169; Y10T 29/4973; Y10T 29/49718

USPC ................ 29/854, 402.01, 402.03, 402.08
See application file for complete search history.

(56) References Cited

U.S. PATENT DOCUMENTS

| 3,667,101 A * | 6/1972 | Kloth ............... H01R 13/432 29/749 |
| 5,297,335 A * | 3/1994 | Vancil ................. G21D 1/02 29/868 |
| 8,203,227 B2 | 6/2012 | Fischer |
| 8,648,482 B2 | 2/2014 | Hede et al. |
| 2006/0199411 A1* | 9/2006 | Singh ............... H01R 13/625 439/314 |

(Continued)

FOREIGN PATENT DOCUMENTS

| EP | 2 147 885 A1 | 1/2010 |
| WO | 2006/056196 A1 | 6/2006 |
| WO | 2012/130245 A2 | 10/2012 |

OTHER PUBLICATIONS

U.S. Appl. No. 14/959,316, filed Dec. 4, 2015.

(Continued)

*Primary Examiner* — Donghai D Nguyen
(74) *Attorney, Agent, or Firm* — Dority & Manning, P.A.

(57) ABSTRACT

A method for refurbishing a wind turbine includes terminating use of an existing uptower electrical system of the wind turbine. The method also includes installing a new uptower electrical system for the wind turbine at an uptower location of the wind turbine. Further, the method includes providing an electrical adaptor at an uptower location for connecting the new uptower electrical system with an existing downtower electrical system. Moreover, the method includes electrically connecting the electrical adaptor between the existing downtower electrical system and the new uptower electrical system.

20 Claims, 10 Drawing Sheets

(56) References Cited

U.S. PATENT DOCUMENTS

2011/0187105 A1  8/2011  Minami et al.
2015/0084439 A1  3/2015  Trzemzalski et al.
2017/0097110 A1  4/2017  Hamsho et al.

OTHER PUBLICATIONS

Extended European Search Report and Opinion issued in connection with corresponding EP Application No. 18176307.9 dated Oct. 15, 2018.

* cited by examiner

METHODS FOR REFURBISHING WIND TURBINES

FIELD OF THE INVENTION

The present disclosure relates generally to wind turbines, and more particularly to the methods for refurbishing electrical systems of wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, machine head, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine technology is rapidly progressing. Accordingly, as the technology utilized in existing wind turbines becomes outdated and/or existing wind turbines approach their designed lives, it may be desirable to refurbish such existing wind turbines and associated wind farms. Such refurbishment can provide various advantages, including the implementation of newer, more efficient technology and components on existing base components. For example, in many cases, the electrical system if the wind turbine may need to be updated and/or replaced. Thus, a new, more technologically-advanced electrical system can be provided to an existing wind turbine. Accordingly, additional life and more efficient power generation can be provided with reduced capital expenses.

One concern, however, is that the new electrical system may not be compatible with the existing electrical system. Accordingly, improved methods for refurbishing wind turbines with a new electrical system would be desired in the art. In particular, methods which reduce the cost and complexity associated with providing a new electrical system to the wind turbine would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for refurbishing a wind turbine. The method includes terminating use of an existing uptower electrical system and an existing downtower electrical system of the wind turbine. Further, the method includes installing a new uptower electrical system and a new downtower electrical system for the wind turbine in an uptower location and a downtower location of the wind turbine, respectively. The method also includes providing an electrical adaptor for connecting the new uptower electrical system with the new downtower electrical system. Thus, the method further includes electrically connecting the electrical adaptor between the new uptower electrical system and the new downtower electrical system.

In one embodiment, the method may include removing at least one of the existing uptower electrical system or the existing downtower electrical system and installing at least one of the new uptower electrical system or the new downtower electrical system in place of the removed electrical system. In another embodiment, the method may include removing at least one of the existing uptower electrical system or the existing downtower electrical system via a crane.

In another embodiment, the existing downtower electrical system or the new downtower electrical system may include a power converter, a downtower junction box, one or more electrical cabinets, a transformer, one or more circuits, a control system, and/or any other suitable electrical components. In further embodiments, the new uptower electrical system or the existing uptower electrical system may include a generator, a control system, a power converter, one or more yaw drive mechanisms, one or more pitch drive mechanisms, one or more fans, one or more motors, one or more pumps, a cooling system, and/or any other suitable electrical components.

In additional embodiments, the uptower location may be within a nacelle of the wind turbine, and the downtower location may be within or outside of a tower of the wind turbine.

In particular embodiments, the step of electrically connecting the electrical adaptor between the new uptower electrical system and the new downtower electrical may include electrically connecting the electrical adaptor to a first cable bundle electrically connected to the new uptower electrical system and a second cable bundle electrically connected to the new downtower electrical system. In such embodiments, the second cable bundle may include more cables than the first cable bundle. In addition, in certain embodiments, the cables of the first cable bundle may be constructed of a different material than the cables of the second cable bundle.

In another aspect, the present disclosure is directed to a method for refurbishing a wind turbine. The method includes terminating use of an existing uptower electrical system of the wind turbine. The method also includes installing a new uptower electrical system for the wind turbine at an uptower location of the wind turbine. Further, the method includes providing an electrical adaptor at an uptower location for connecting the new uptower electrical system with an existing downtower electrical system. Moreover, the method includes electrically connecting the electrical adaptor between the existing downtower electrical system and the new uptower electrical system. It should be understood that the method may further include any of the additional steps and/or features as described herein.

In yet another aspect, the present disclosure is directed to a method for refurbishing a wind turbine. The method includes terminating use of an existing downtower electrical system of the wind turbine. Further, the method includes installing a new downtower electrical system for the wind turbine at a downtower location of the wind turbine. Moreover, the method includes providing an electrical adaptor at the downtower location for connecting the new downtower electrical system with an existing uptower electrical system. In addition, the method includes electrically connecting the electrical adaptor between the existing uptower electrical system and the new downtower electrical system.

In one embodiment, the method may include removing the existing downtower electrical system of the wind turbine. In another embodiment, the new downtower electrical system may include a power converter, a downtower junction box, one or more electrical cabinets, a transformer, one or more circuits, a control system, or any other suitable electrical components. In further embodiments, the existing uptower electrical system may include a generator, a control system, a power converter, one or more yaw drive mechanisms, one or more pitch drive mechanisms, one or more fans, one or more motors, one or more pumps, a cooling system, or any other suitable electrical components.

In additional embodiments, the downtower location may be within a tower of the wind turbine. Alternatively, the downtower location may be outside of a tower of the wind turbine.

In several embodiments, the step of electrically connecting the electrical adaptor between the existing uptower electrical system and the new downtower electrical system may include electrically connecting the electrical adaptor to a first cable bundle electrically connected to the existing uptower electrical system and a second cable bundle electrically connected to the new downtower electrical system. In such embodiments, the second cable bundle may have more cables than the first cable bundle. In addition, in particular embodiments, the cables of the first cable bundle may be constructed of a different material than the cables of the second cable bundle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
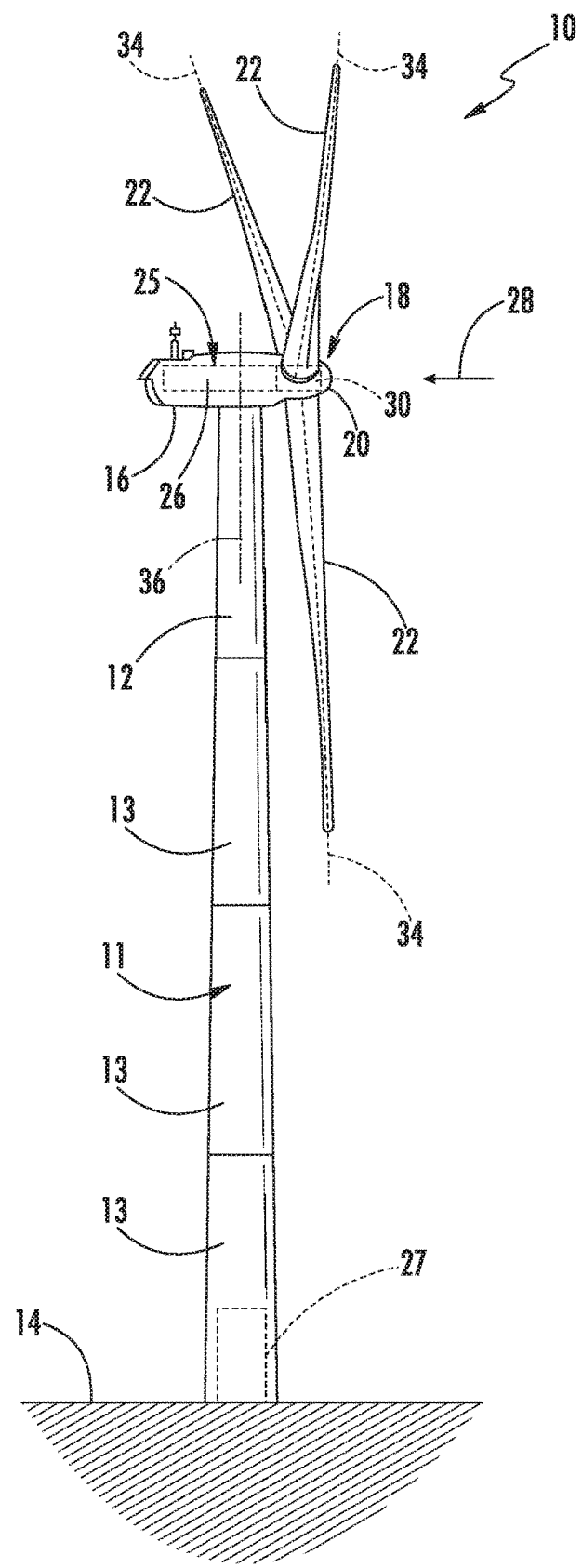
FIG. 1 illustrates a perspective view of one embodiment of a wind turbine having an existing electrical system according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for refurbishing wind turbines with new or updated electrical systems. More specifically, the present disclosure is directed to an electrical adapter used to interface the two electrical systems. As such, the new and existing electrical systems do not have to be reconfigured. Rather, the electrical adaptor can be easily installed uptower or downtower and the cables from each system connected thereto. Further, the electrical adaptor of the present disclosure minimizes heat rise and arc flash between the two systems.

More specifically, the electrical adaptor of the present disclosure provides cable management into stator-to-stator and rotor-to-rotor for a DFIG and/or stator-to-stator for devices requiring full power conversion. This allows for ease of implementation and balance of currents which preserve ampacity. In addition, the electrical adaptor provides anodic to cathodic neutralization for dissimilar metal connection, which allows the use of less expensive metals when possible. Further, the electrical adaptor may include bus bars and enclosure sizing having a certain heat cap, which allows for a full ampacity range at the cable jacket temperature. Moreover, the electrical adaptor provides a common connection point for at least two sets of cables, thereby allowing for splitting of the quantity of cables such that ampacity calculations can be done for the uptower and downtower electrical systems without massive de-ratings. The electrical adaptor may further allow for mechanical sizing to support extreme cable weights which allows for an increase in the quantity of cables. Further, the electrical adaptor may be sized such that it can fit through a turbine door in the wind turbine tower and lowered into the basement where it can be assembled. This allows for not de-stacking the tower or cutting the floor to the basement.

Referring now to the drawings, FIG. 1 illustrates a perspective view of one embodiment of an existing wind turbine 10. As shown, the wind turbine 10 includes a tower 11 extending from a support surface 14, a machine head 16 mounted on the tower 11, and a rotor 18 coupled to the machine head 16. Further, as shown, the tower 11 may include a plurality of tower sections which are stacked on top of each other along a vertical direction to form the tower 11. More specifically, as shown, the plurality of tower sections may include an upper tower section 12 and one or more lower tower sections 13. The upper tower section 12 may be the uppermost tower section along the vertical direction. The upper tower section 12 may be connected to a lower tower section 13 that is immediately below the upper tower section 12. In some cases, additional lower tower sections 13 may additionally be provided under the lower tower section 13 to which the upper tower section 12 is connected.

The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 3) positioned within the machine head 16 to permit electrical energy to be produced.

As shown, the wind turbine 10 may also include an existing electrical system that provides electrical power to the various components of the wind turbine 10. For example, as shown in FIG. 1, the existing electrical system may include an uptower electrical system 25 and/or a downtower electrical system 27. More specifically, as shown, the existing uptower electrical system 25 may include the generator 24, a turbine control system or a turbine controller 26, a power converter, one or more yaw drive mechanisms 38, one or more pitch drive mechanisms 32 and corresponding pitch controllers 30, one or more fans, one or more motors, one or more pumps, a cooling system, or any other suitable electrical components. In addition, the existing downtower electrical system 27 may include a power converter, a downtower junction box, one or more electrical cabinets, a transformer, one or more circuits, a control system, or any other suitable electrical components.

Further, as shown, the turbine controller 26 may be centralized within the machine head 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 (FIG. 2) of the wind turbine, or by directly controlling the operation of the plurality of pitch drives or pitch adjustment mechanisms. Specifically, the rotor blades 22 may be rotatably mounted to the hub 20 by one or more pitch bearing(s) (not illustrated) such that the pitch angle may be adjusted by rotating the rotor blades 22 along their pitch axes 34 using the pitch adjustment mechanisms 32. Further, as the direction 28 of the wind changes, the turbine controller 26 may be configured to control a yaw direction of the machine head 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the machine head 16 may be rotated about the yaw axis 36.

It should be appreciated that the turbine controller 26 and/or the pitch controller 30 may generally comprise a computer or any other suitable processing unit. Thus, in several embodiments, the turbine controller 26 and/or pitch and yaw controllers may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 and/or pitch and yaw controllers may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the turbine controller 26 and/or pitch and yaw controllers to perform various computer-implemented functions. In addition, the turbine controller 26 and/or pitch and yaw controllers may also include various input/output channels for receiving inputs from sensors and/or other measurement devices and for sending control signals to various components of the wind turbine 10.

Figure 2:
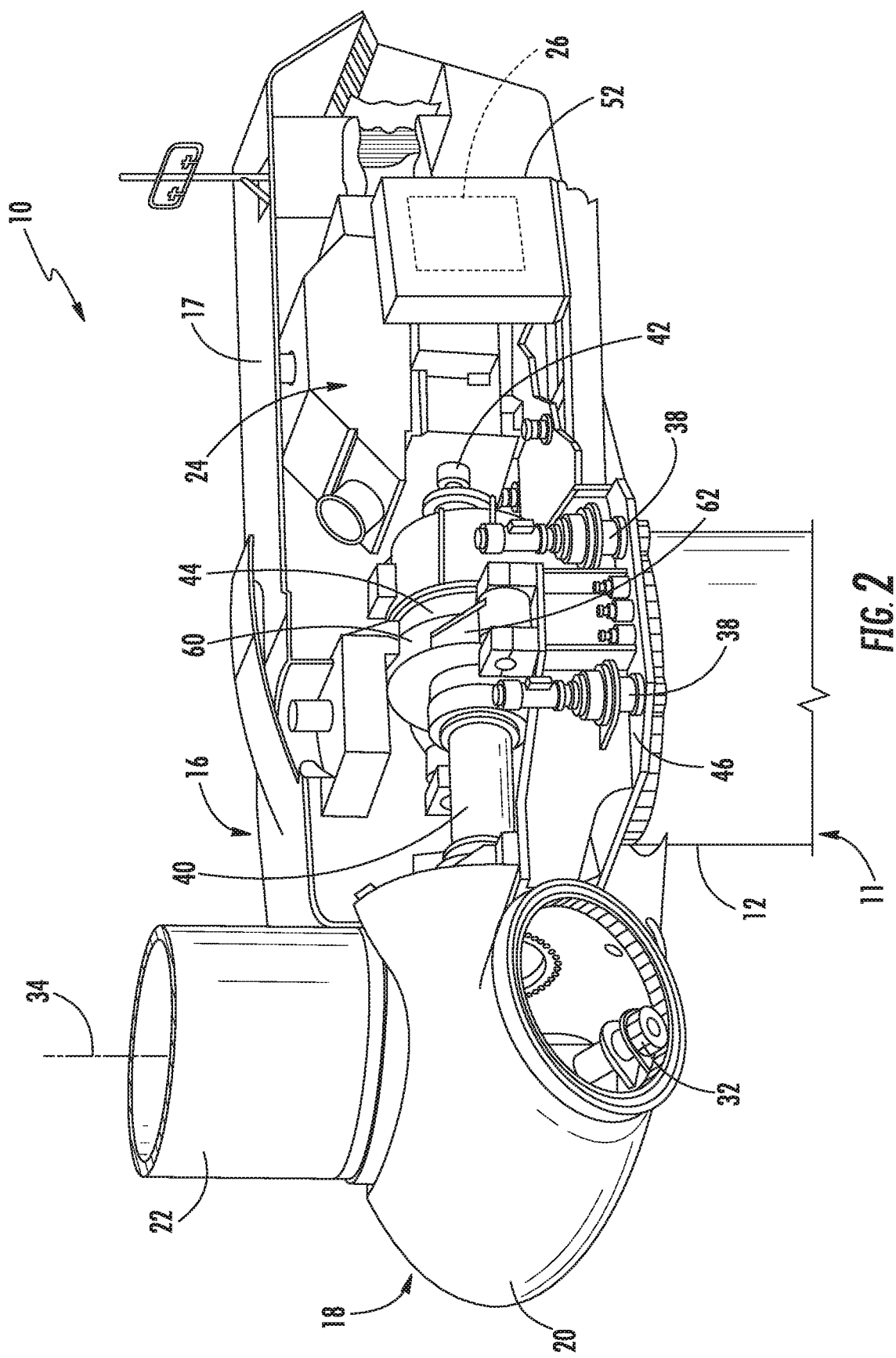
FIG. 2 illustrates a perspective, internal view of one embodiment of an existing machine head of a wind turbine according to the present disclosure.

Referring now to FIG. 2, a simplified, internal view of one embodiment of the existing machine head 16 of the wind turbine 10 is illustrated. As shown, a generator 24 may be disposed within the machine head 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40 (often referred to as a "direct-drive wind turbine").

It should be appreciated that the main shaft 40 may generally be supported within the machine head 16 by a base frame or bedplate 46 positioned atop the wind turbine tower 11. For example, the main shaft 40 may be supported by the bedplate 46 via one or more pillow blocks mounted to the bedplate 46.

Additionally, as indicated above, the turbine controller 26 may also be located within the machine head 16 of the wind turbine 10. For example, as shown in the illustrated embodiment, the turbine controller 26 is disposed within a control cabinet 52 mounted to a portion of the machine head 16. However, in other embodiments, the turbine controller 26 may be disposed at any other suitable location on and/or within the wind turbine 10 or at any suitable location remote to the wind turbine 10. Moreover, as described above, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the machine head 16 relative to the direction 28 (FIG. 1) of the wind. Similarly, the turbine controller 26 may also be communicatively coupled to each pitch adjustment mechanism 32 of the wind turbine 10 (one of which is shown) through the pitch controller 30 for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

Referring still to FIG. 2, the gearbox 44 may be coupled to the main shaft 40, and may be mounted to the bedplate 46. As shown, the gearbox 44 may include an outer casing 60 which may surround and generally enclose the internal gearbox components, such as the various gears, etc. thereof. Further, one or more torque arms 62 may extend from the outer casing 60. Typically, two torque arms 62 extend from the outer casing 60 on generally opposing sides of the casing 60. A torque arm 62 may generally facilitate reaction and transmission of loads to which the shaft 40, etc., are subjected by transmitting these loads from the gearbox 44 to, for example, the base frame 46.

As illustrated, a nacelle 17 may surround and enclose the various components within the machine head 16. In general, the bedplate 46 and the nacelle 17 may form the outer surface(s) of the machine head 16.

Figure 3:
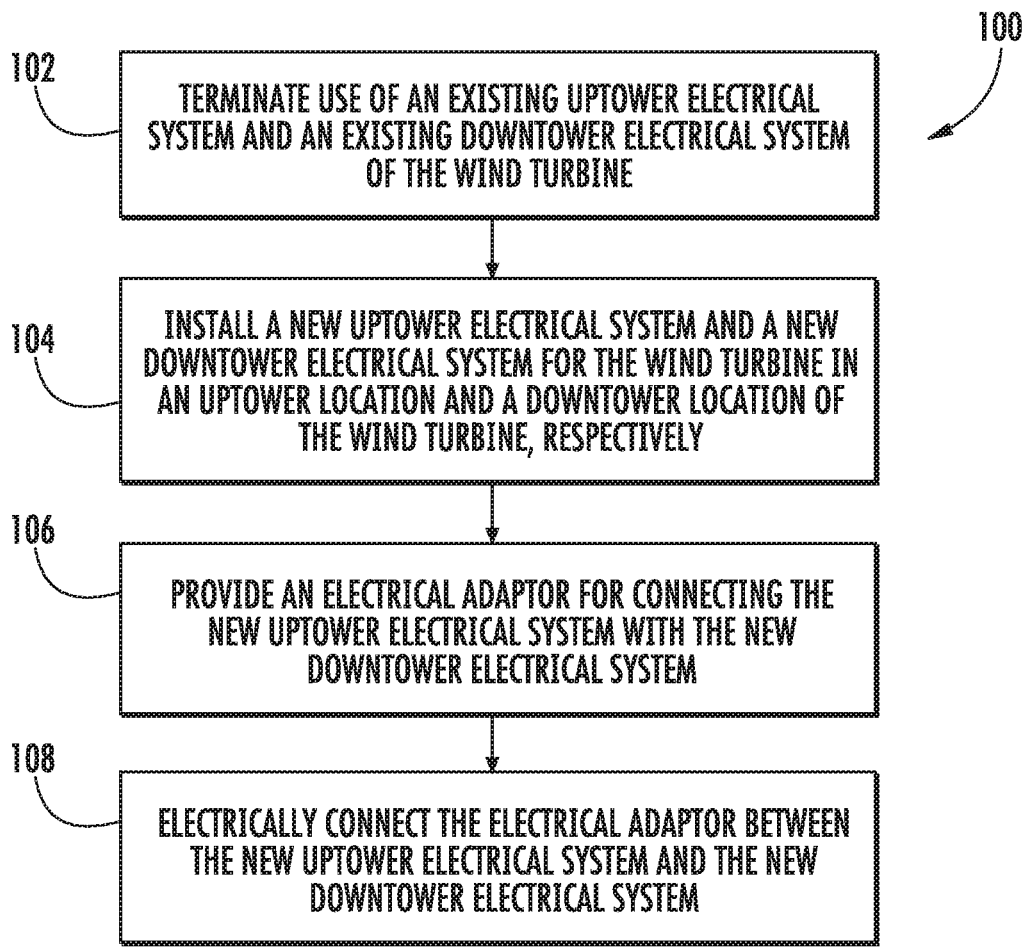
FIG. 3 illustrates a flow diagram of one embodiment of a method for refurbishing a wind turbine according to the present disclosure.
Figure 4:
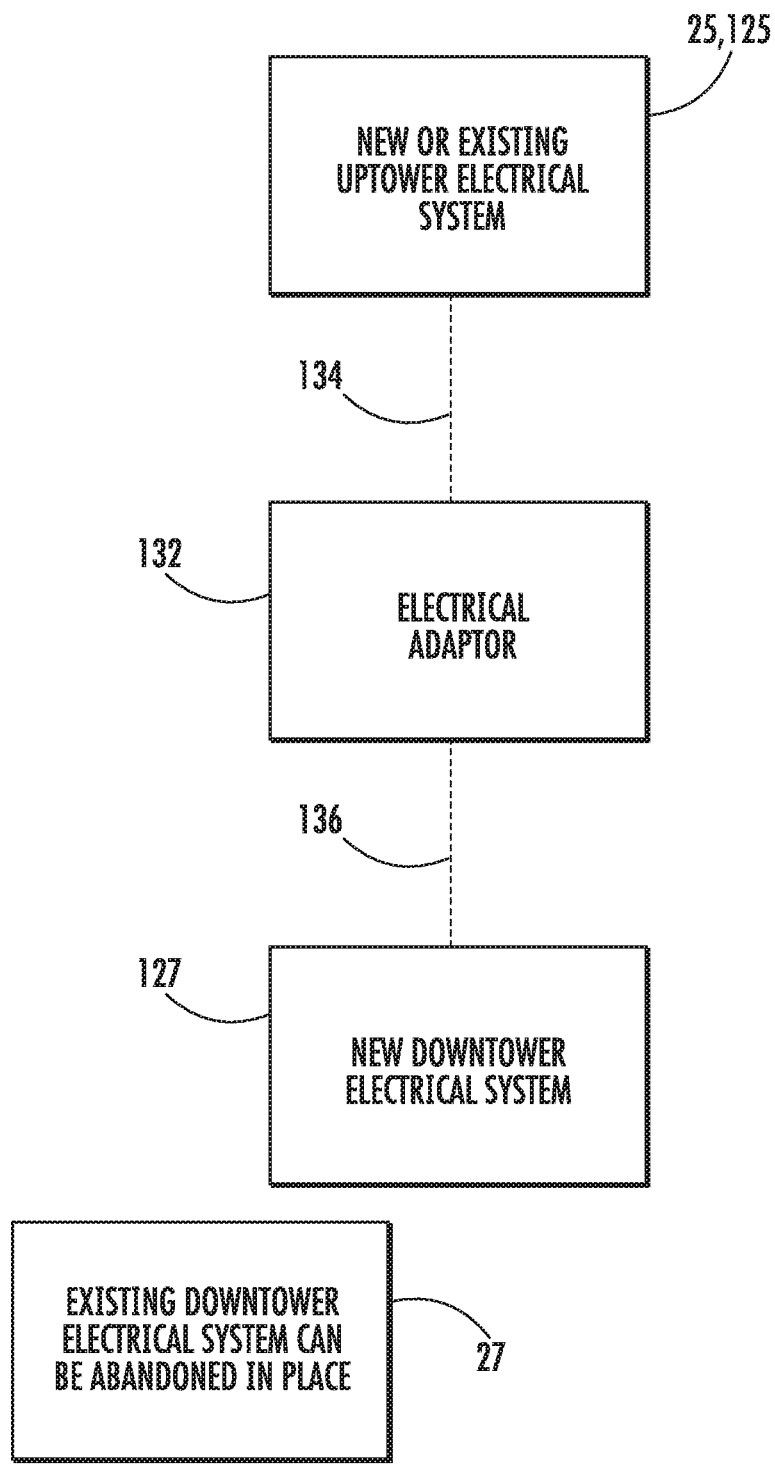
FIG. 4 illustrates a schematic block diagram of one embodiment of a new or existing uptower electrical system connected to a new downtower electrical system via an electrical adaptor according to the present disclosure.

As discussed herein, the present disclosure is directed to methods for refurbishing wind turbines 10. For example, as shown in FIG. 3, a flow diagram of one embodiment a method 100 for refurbishing the wind turbine 10 of FIG. 1 is illustrated. As shown at 102, such methods may include terminating use of the existing uptower electrical system 25 and/or the existing downtower electrical system 27 of the wind turbine 10. For example, in one embodiment, as shown in FIG. 4, use of the existing downtower electrical system 27 may be terminated and the existing downtower electrical system 27 may be abandoned in place. Alternatively, use of the existing uptower and/or the downtower electrical systems 25, 27 may be terminated and the existing uptower and/or downtower electrical systems 25, 27 may be removed. Such removal, provision, and connection may occur via the use of conventional apparatus such as cranes and conventional tools for fastening and unfastening the various connections, as is generally understood.

Further, as shown at 104, the method 100 includes installing a new uptower electrical system 125 and a new downtower electrical system 127 for the wind turbine 10 in an uptower location and a downtower location of the wind turbine 10, respectively. Moreover, as shown at 106, the method 100 includes providing an electrical adaptor 132 for connecting the new uptower electrical system 125 with the new downtower electrical system 127. Thus, as shown at 108, the method 100 further includes electrically connecting the electrical adaptor 132 between the new uptower electrical system 125 and the new downtower electrical system 127.

Figure 5:
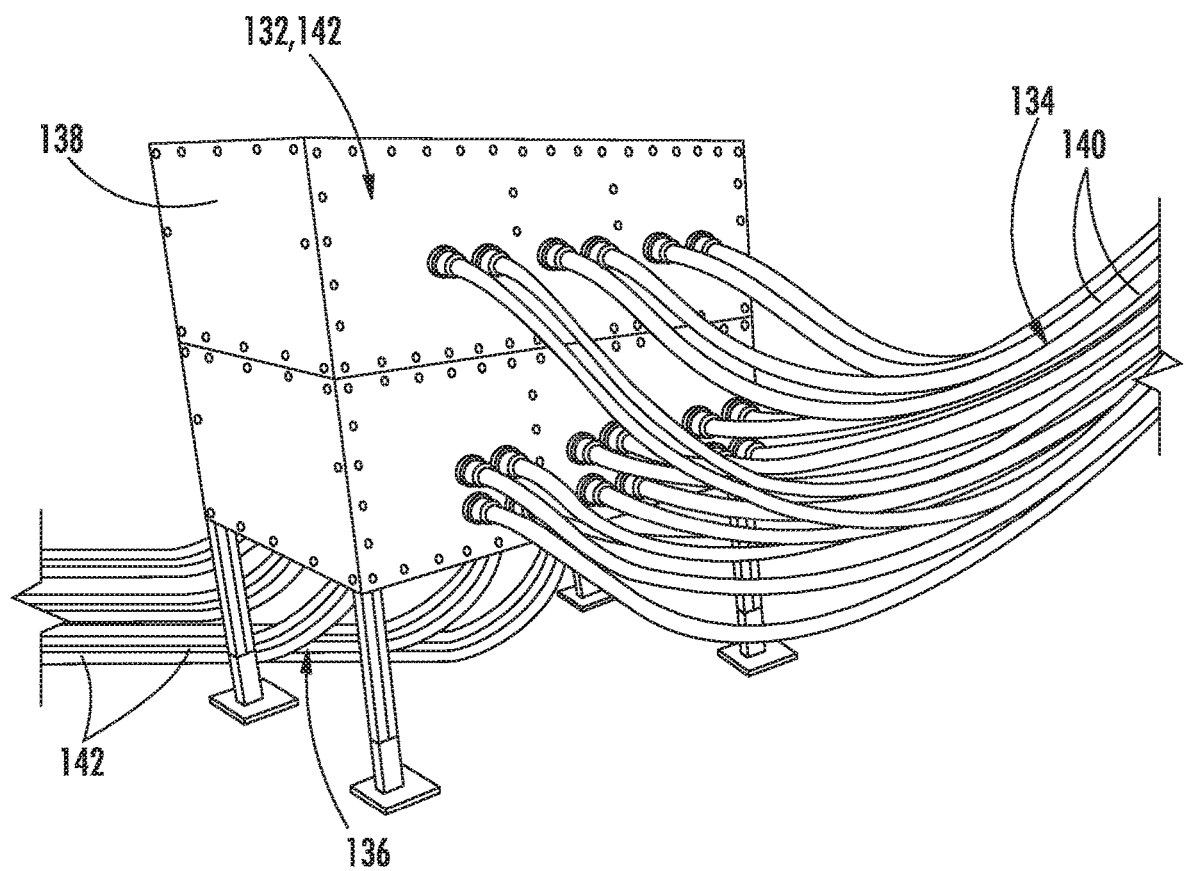
FIG. 5 illustrates a perspective view of one embodiment of an electrical adaptor connected first and second cable bundles according to the present disclosure.

Referring now to FIG. 5, a perspective view of one embodiment of the electrical adaptor 132 is illustrated. As shown, the electrical adaptor 132 may include an electrical cabinet 138 that houses cable ends of the first and second cable bundles 134, 136. More specifically, as shown, the first cable bundle 134 includes a first set of cables 140, whereas the second cable bundle 136 includes a second set of cables 142. As such, the first set of cables 140 electrically connects to the new uptower existing system 125 and extends from a side wall of the electrical cabinet 138 of the electrical adaptor 132. For example, in one embodiment, the first cable bundle 134 may correspond to a drip loop cable bundle having a plurality of cables 140 which extend through the tower 11 and to the machine head 16. For example, the cables 140 of the bundle 134 may be connectable to the machine head 16, i.e. to various internal components thereof, to supply power and/or communications thereto. The cables 140 may further be connectable to suitable power and or communications sources.

Moreover, as shown in FIG. 4, the second set of cables 142 electrically connects to the existing or new downtower electrical system 27, 127 and extends from a bottom wall of the electrical cabinet 138 of the electrical adaptor 132 (FIG. 5). It should be further understood that the first and second sets of cables 140, 142 may extend from any wall of the electrical cabinet 138 of the electrical adaptor 132 and the embodiment of FIG. 5 is provided for illustrative purposes only.

In addition, as shown, the second cable bundle 136 may include more cables 140 than the first cable bundle 134. Further, in certain embodiments, the cables 140 of the second cable bundle 136 may be constructed of a different material than the cables of the first cable bundle 134. For example, in one embodiment, the cables 142 of the second cable bundle 134 may be constructed of aluminum, whereas the cables 140 of the first cable bundle 134 may be constructed of copper. It should be further understood that the cables 140, 142 may be constructed of any other materials and may be the same or different.

Figure 6:
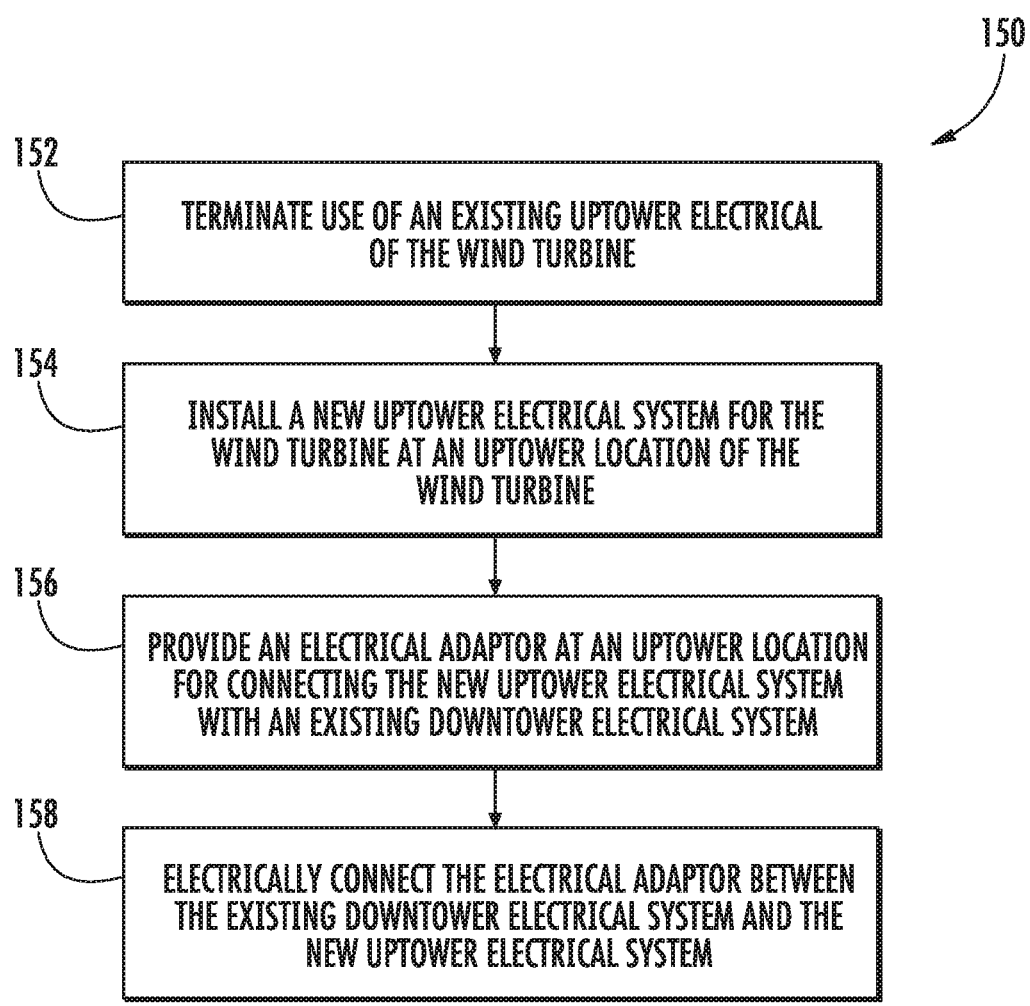
FIG. 6 illustrates a flow diagram of another embodiment of a method for refurbishing a wind turbine according to the present disclosure.
Figure 7:
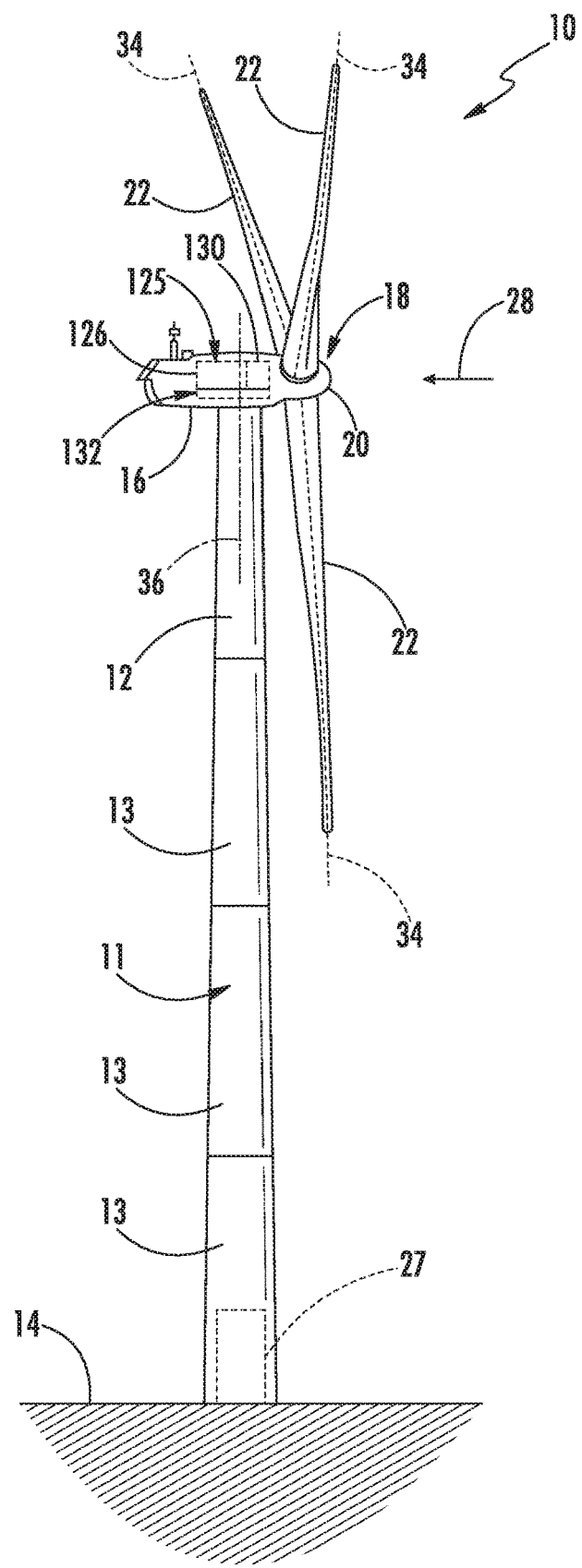
FIG. 7 illustrates a perspective view of one embodiment of a wind turbine having a new uptower electrical system according to the present disclosure.

Referring now to FIG. 6, a flow diagram of another embodiment of a method 150 for refurbishing the wind turbine 10 of FIG. 1 is illustrated. As shown at 152, the method 150 includes terminating use of the existing uptower electrical system 25 of the wind turbine 10. For example, in one embodiment, the method 150 may include removing the existing uptower electrical system 25 of the wind turbine 10. Such removal, provision, and connection may occur via the use of conventional apparatus such as cranes and conventional tools for fastening and unfastening the various connections, as is generally understood. Further, as shown at 154, the method 150 includes installing a new uptower electrical system 125 for the wind turbine 10 at an uptower location, e.g. within the nacelle 17, of the wind turbine 10. For example, as shown in FIG. 7, the method 150 may include installing the new uptower electrical system 125 for the wind turbine 10 in place of the removed existing uptower electrical system 25, i.e. atop the bedplate 46 within the nacelle 17.

The new uptower electrical system 125 may include new components relative to the components of the existing uptower electrical system 25, and in exemplary embodiments one or more of these components is a technologically advanced component (relative to the corresponding component of the existing uptower electrical system 25) that facilitates the implementation of newer, more efficient technology. Although, it should be understood that the new uptower electrical system 125 may include similar components to the existing uptower electrical system 125, such as a new generator, a new turbine controller 126, a power converter, one or more yaw drive mechanisms, one or more pitch drive mechanisms and corresponding new pitch controllers 130, one or more fans, one or more motors, one or more pumps, a cooling system, or any other suitable electrical components.

As shown at 156, the method 150 further includes providing an electrical adaptor 132 at an uptower location for connecting the new uptower electrical system 25 with the existing downtower electrical system 27. Further, as shown at 158, the method 150 includes electrically connecting the electrical adaptor 132 between the existing downtower electrical system 27 and the new uptower electrical system 125. In other words, embodiments of the present disclosure allow for one or both of the uptower and/or downtower electrical systems to be removed and replaced.

Figure 10:
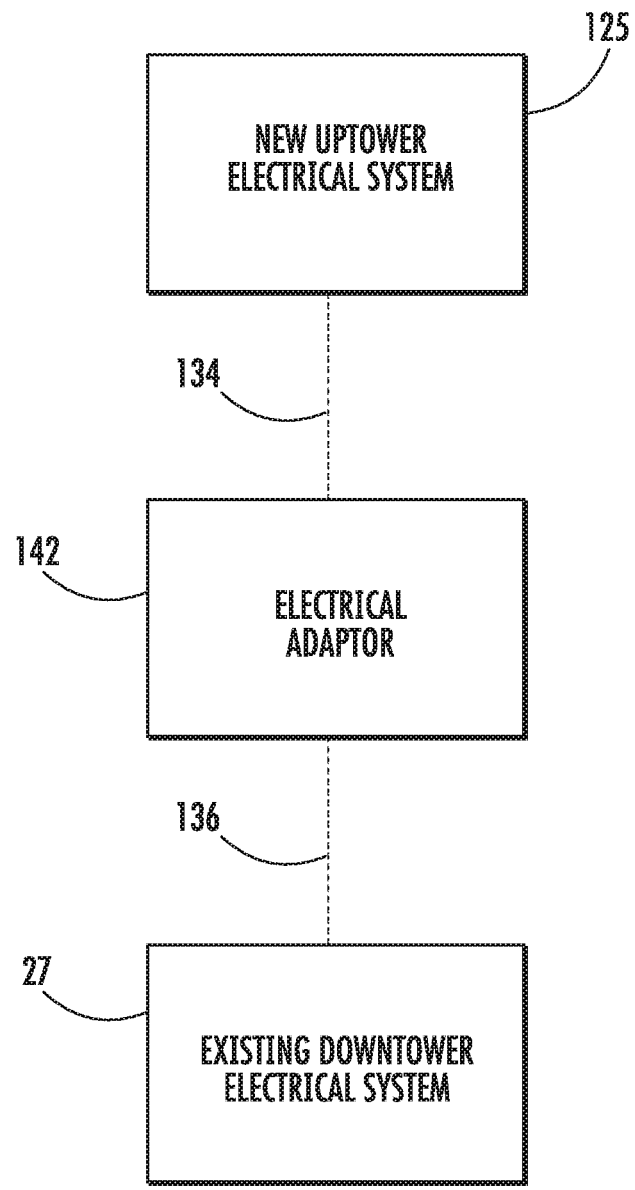
FIG. 10 illustrates a schematic block diagram of one embodiment of a new uptower electrical system connected to an existing downtower electrical system via an electrical adaptor according to the present disclosure.

For example, as shown in FIG. 10, the electrical adaptor 142 is electrically coupled between the existing downtower electrical system 27 and the new uptower electrical system 125 via first and second cable bundles 134, 136. More specifically, as shown, the electrical adaptor 142 is electrically coupled to the existing downtower electrical system 27 via the second cable bundle 136. In addition, as shown, the electrical adaptor 142 is electrically coupled to the new uptower electrical system 125 via the first cable bundle 134. Further, as shown in the illustrated embodiment of FIGS. 7 and 10, the electrical adaptor 142 may be located at any suitable uptower location, e.g. within the machine head 16, and provides electrical compatibility between the new and existing systems.

Figure 8:
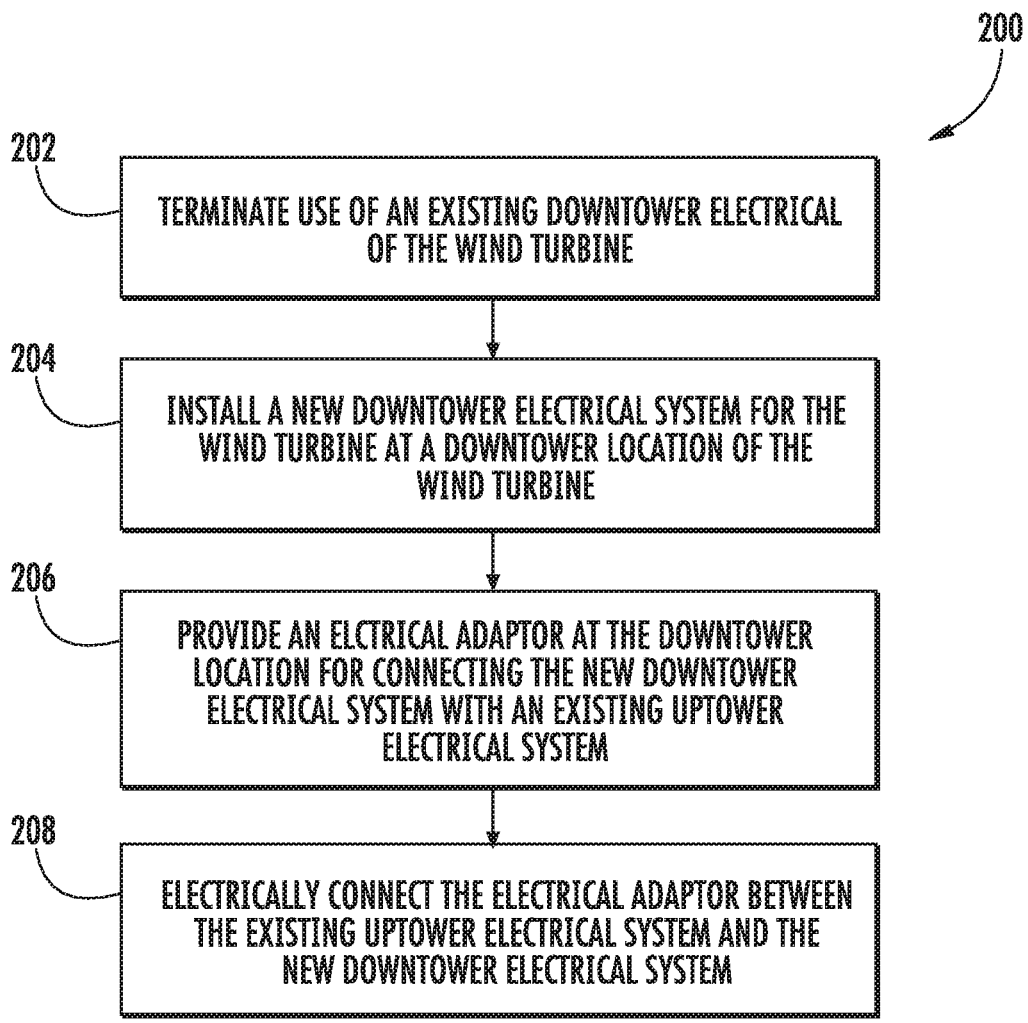
FIG. 8 illustrates a flow diagram of yet another embodiment of a method for refurbishing a wind turbine according to the present disclosure.

Referring now to FIG. 8, a flow diagram of another embodiment of a method 200 for refurbishing the wind turbine 10 of FIG. 1 is illustrated. As shown at 202, the method 200 includes terminating use of the existing downtower electrical system 27 of the wind turbine 10. For example, as shown in FIG. 4, use of the existing downtower electrical system 27 may be terminated and the existing downtower electrical system 27 may be abandoned in place. Alternatively, in one embodiment, the method 200 may include removing the existing downtower electrical system 27 of the wind turbine 10. Such removal, provision, and connection may occur via the use of conventional apparatus such as cranes and conventional tools for fastening and unfastening the various connections, as is generally understood.

Figure 9:
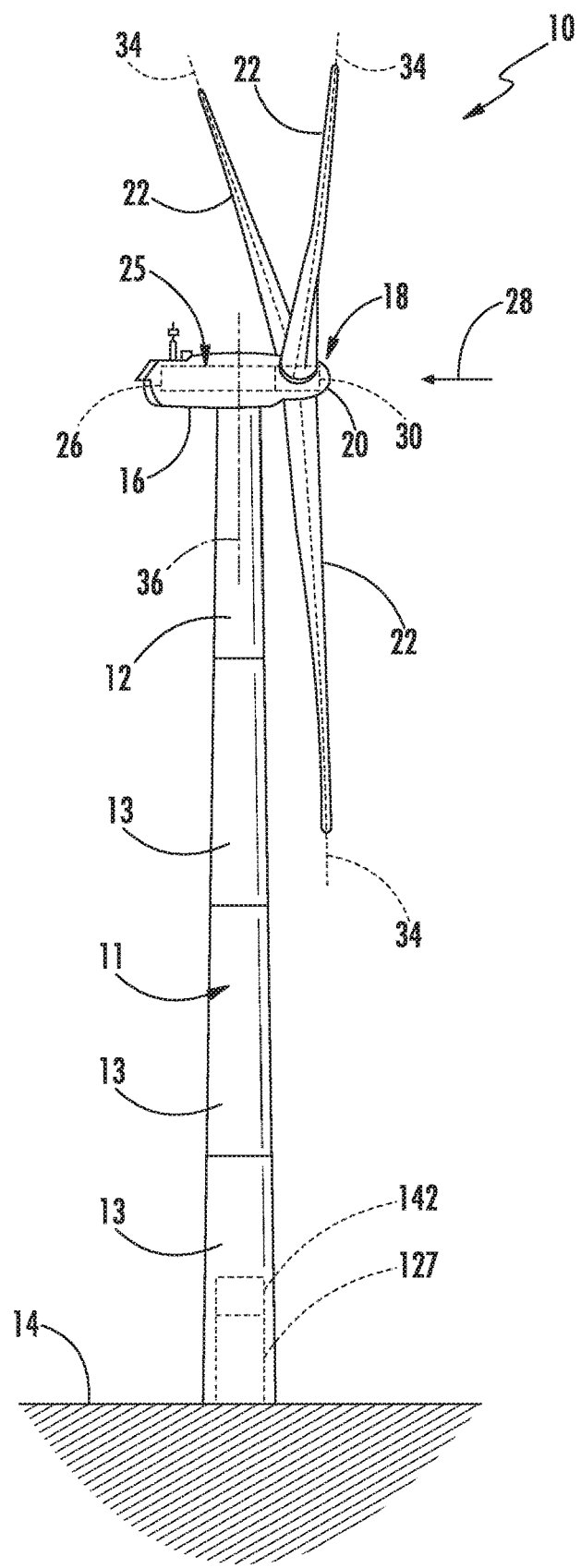
FIG. 9 illustrates a perspective view of one embodiment of a wind turbine having a new downtower electrical system according to the present disclosure.

Referring still to FIG. 8, as shown at 204, the method 200 includes installing a new downtower electrical system 127 for the wind turbine 10 at a downtower location of the wind turbine 10. For example, as shown in FIG. 9, the downtower location may be atop the support surface 14, either within a basement of the tower 11 (as shown) or outside of the tower 11. Further, as shown at 206 of FIG. 8, the method 200 further includes providing an electrical adaptor 142 at the downtower location. Thus, as shown at 208, the method 200 includes electrically connecting the electrical adaptor 142 between the existing uptower electrical system 25 and the new downtower electrical system 127.

It should be understood that the downtower electrical adaptor 142 may be configured similar to the uptower electrical adaptor 132 illustrated in FIG. 5. Further, as shown particularly in FIG. 10, the electrical adaptor 142 may be electrically connected between the new uptower electrical system 125 and the existing downtower electrical system 27 via first and second cable bundles 134, 136, respectively.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for refurbishing a wind turbine, the method comprising:
   terminating use of an uptower electrical system or a downtower electrical system of the wind turbine;
   replacing at least one of uptower electrical system or the downtower electrical system by installing at least one new electrical system in an uptower location or a downtower location of the wind turbine, wherein, following the installation of the at least one new electrical system, the uptower electrical system and the downtower electrical system have an electrical incompatibility therebetween;
   providing an electrical adaptor for connecting the uptower electrical system with the downtower electrical system, the electrical adapter being a common connection point providing an electrical compatibility between the uptower and downtower electrical systems; and
   electrically connecting the electrical adaptor between the electrically incompatible uptower and downtower electrical systems so as to provide electrical compatibility between the uptower and downtower electrical systems.

2. The method of claim 1, further comprising removing at least one of the uptower electrical system or the downtower electrical system and installing the at least one of the new electrical system in place of the removed electrical system.

3. The method of claim 1, wherein:
   the downtower electrical system comprises at least one of a power converter, a downtower junction box, one or more electrical cabinets, a transformer, one or more circuits, or a control system; and
   the new uptower electrical system comprises at least one of a generator, a control system, a power converter, one or more yaw drive mechanisms, one or more pitch drive mechanisms, one or more fans, one or more motors, one or more pumps, or a cooling system.

4. The method of claim 1, wherein electrically connecting the electrical adaptor between the uptower electrical system and the downtower electrical system further comprises:
   electrically connecting the electrical adaptor to a first cable bundle electrically connected to the uptower electrical system and a second cable bundle electrically connected to the downtower electrical system, wherein the second cable bundle comprises more cables than the first cable bundle.

5. The method of claim 4, wherein cables of the first cable bundle are constructed of a different material than cables of the second cable bundle.

6. The method of claim 1, wherein providing the electrical adapter minimizes heat rise and arc flash between the uptower and downtower electrical systems.

7. The method of claim 1, wherein providing the electrical adapter further provides anodic to cathodic neutralization for a dissimilar metal connection.

8. The method of claim 1, wherein the electrical adapter further comprises at least one bus bar and an enclosure sizing which facilitates a full ampacity range at a cable jacket temperature.

9. A method for refurbishing a wind turbine, the method comprising:

terminating use of an existing uptower electrical system of the wind turbine;

installing a new uptower electrical system for the wind turbine at an uptower location of the wind turbine, the new uptower electrical system being electrically incompatible with an existing downtower electrical system;

providing an electrical adaptor at an uptower location for connecting the new uptower electrical system with the existing downtower electrical system, the electrical adapter being a common connection point providing an electrical compatibility between the new uptower electrical system and the existing downtower electrical system; and electrically connecting the electrical adaptor between the electrically incompatible electrical systems so as to provide electrical compatibility between the new uptower electrical system and the existing downtower electrical system.

10. The method of claim 9, further comprising removing the existing uptower electrical system of the wind turbine.

11. The method of claim 9, wherein electrically connecting the electrical adaptor between the existing uptower electrical system and the new downtower electrical system further comprises:

electrically connecting the electrical adaptor to a first cable bundle electrically connected to the existing uptower electrical system and a second cable bundle electrically connected to the new downtower electrical system, wherein the second cable bundle comprises more cables than the first cable bundle.

12. The method of claim 11, wherein the electrical adapter further provides anodic to cathodic neutralization for a dissimilar metal connection.

13. A method for refurbishing a wind turbine, the method comprising:

terminating use of an existing downtower electrical system of the wind turbine;

installing a new downtower electrical system for the wind turbine at a downtower location of the wind turbine, the new downtower electrical system being electrically incompatible with an existing uptower electrical system;

providing an electrical adaptor for connecting the new downtower electrical system with the existing uptower electrical system, the electrical adapter being a common connection point providing an electrical compatibility between the new downtower electrical system and the existing uptower electrical system; and electrically connecting the electrical adaptor between the electrically incompatible electrical systems so as to provide electrical compatibility between the new downtower electrical system and the existing uptower electrical system.

14. The method of claim 13, further comprising removing the existing downtower electrical system of the wind turbine.

15. The method of claim 13, wherein:

the new downtower electrical system comprises at least one of a power converter, a downtower junction box, one or more electrical cabinets, a transformer, one or more circuits, or a control system; and the existing uptower electrical system comprises at least one of a generator, a control system, a power converter, one or more yaw drive mechanisms, one or more pitch drive mechanisms, one or more fans, one or more motors, one or more pumps, or a cooling system.

16. The method of claim 13, wherein the downtower location is within a tower of the wind turbine.

17. The method of claim 13, wherein electrically connecting the electrical adaptor between the existing uptower electrical system and the new downtower electrical system further comprises:

electrically connecting the electrical adaptor to a first cable bundle electrically connected to the existing uptower electrical system and a second cable bundle electrically connected to the new downtower electrical system, wherein the second cable bundle comprises more cables than the first cable bundle.

18. The method of claim 17, wherein cables of the first cable bundle are constructed of a different material than cables of the second cable bundle.

19. The method of claim 13, wherein providing the electrical adapter further provides anodic to cathodic neutralization for a dissimilar metal connection.

20. The method of claim 13, wherein the electrical adapter further comprises at least one bus bar and an enclosure sizing which facilitates a full ampacity range at a cable jacket temperature.

* * * * *